May 21, 1935.   K. KADEN   2,002,399
FLAT SPRING AND METHOD OF MAKING THE SAME

Filed Jan. 15, 1932

INVENTOR.
KARL KADEN
BY Richards & Geier
ATTORNEYS

Patented May 21, 1935

2,002,399

UNITED STATES PATENT OFFICE 2,002,399

FLAT SPRING AND METHOD OF MAKING THE SAME

Karl Kaden, Muhlbach Bez. Chemnitz, Germany

Application January 15, 1932, Serial No. 586,838
In Germany April 16, 1931

6 Claims. (Cl. 29—173)

REISSUED
NOV 14 1939,

This invention relates to flat springs and a method of making the same, and refers more particularly to sinuous flat springs and a method of stabilizing or preserving the resiliency of such springs.

Flat springs of the known type having a sinuous shape are used chiefly for the backs of seats, flat cushions, cushioned seats and the like and are usually bent upwards when used for this purpose. They are cheap to produce and of convenient low height when mounted, but, on the other hand, have the drawback that as soon as they are bent under the action of a load beyond their horizontal plane they are deflected still further by said load and fail to recover their initial position.

The invention eliminates this defect by imparting to the flat springs a rounded shape, preferably by passing them through a cylinder rolling mill. A flat spring treated according to the invention will not lose its resiliency even if it is bent through completely towards the side not facing its curvature.

One form of the invention is illustrated in the accompanying drawing, in which

Figure 1:
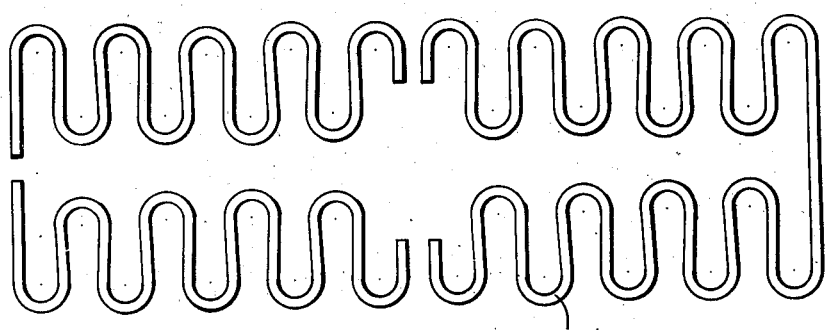
Figure 2:
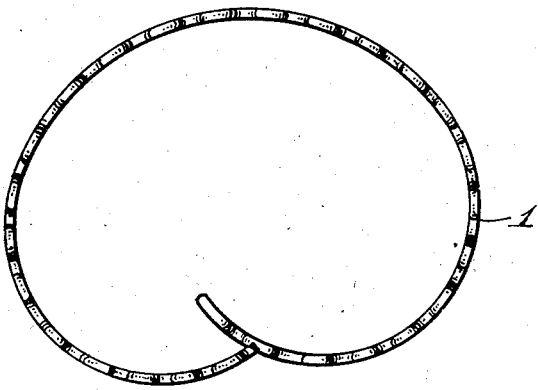
Figure 3:
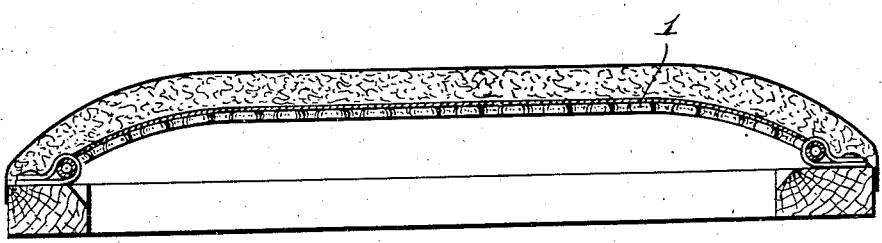

Figure 1 is a top view of a flat spring of the type described having two interconnected sinuous parts which are broken off in the middle;

Fig. 2, a side view of the same spring after the rolling step;

Fig. 3 shows by way of example a rolled sinuous spring used for supporting the seat of a chair.

Referring to the drawing: The flat spring I, which in this case is of the double type though it might just as well be of the single kind, is made round by rolling and brought into the shape shown in Fig. 2, the rolling continuing until the desired radius of curvature is reached.

If a spring I is fastened on both ends when in use, as shown in Fig. 3, it automatically will arrange itself in the form of a curved plane and always return to its initial position even if fully bent through when exposed to a load.

It is advisable to employ a spring of a sinuous shape the turns of which extend parallel to one another, as shown in Fig. 1. The turns of a flat spring fixed on both ends will be pressed somewhat together when subjected to loads, and if the turns extend parallel to one another, a flat spring of this type with curved plane possesses already in its coils an inherent stability in addition to the degree of stability imparted to it by rolling. This is due to the fact that the parallel turns whose resiliency is still unimpaired offer a resistance of their own when loaded and thus assist in preventing the collapse of the spring.

I claim:—

1. The method of making a wire spring including bending the wire laterally into sinuous form and longitudinally to give it a permanent set in a position of greater curvature than it assumes when in use.

2. The method of making a wire spring including bending the wire laterally back and forth in zig-zag form and longitudinally to provide a permanent set on an arc of greater curvature than the spring assumes when in use.

3. A spring for a seat or the like arched on a large radius longitudinally of its length when secured in position, said spring having a permanent set on an arc of comparatively smaller radius longitudinally of its length when unsecured.

4. A spring for a seat or the like arched on a large radius when secured in position, the permanent set of said spring being such as to cause it to assume the shape of an arc of smaller radius when unsecured.

5. The method of making a wire spring including bending the wire laterally into sinuous form and longitudinally to provide a permanent set on an arc of small radius, spreading the ends of the spring so formed to have it assume a curvature of larger radius, and securing said ends in position to provide the unsecured central portion with a tension to resist downward displacement.

6. The method of making a spring including bending and permanently setting resilient stock on an arc materially larger in curvature than the arc upon which it is to be ultimately employed, spreading the ends of said stock thus formed, and securing said ends when so spread to provide the unsecured central portion with a tension to resist downward displacement.

KARL KADEN.